United States Patent Office 3,756,978
Patented Sept. 4, 1973

3,756,978
METHOD OF SOLVATING BUTYL RUBBERS
Robert August Comandini, Raritan, N.J., assignor to Johns-Manville Corporation, New York, N.Y.
No Drawing. Continuation of abandoned application Ser. No. 887,404, Dec. 22, 1969. This application Jan. 20, 1972, Ser. No. 219,493
Int. Cl. C08f 45/28
U.S. Cl. 260—33.6 A
11 Claims

ABSTRACT OF THE DISCLOSURE

Method of solvating tacky, crude butyl rubber for wet admixing and blending, comprising hot extruding crude butyl rubber as a small body of high surface area into low boiling petroleum solvent and mixing therewith.

This is a continuation of application Ser. No. 887,404 filed Dec. 22, 1969 and now abandoned.

BACKGROUND OF THE INVENTION

Unlike many varieties of crude synthetic rubbers which are available on the commercial market in "crumb" form consisting of fine discrete particles whereby their small distinct bodies and large surface area enable easy and quick blending and/or dispersion within a solvent therefor, crude butyl rubbers are particularly difficult to process or work because of their inherent characteristics of a tendency to flow and a very tacky consistency. The crude butyl particles thus adhere to themselves forming large sticky masses which because of their bulk with reduced surface area resist solvent penetration and working thus requiring prolonged periods of soaking with a solvent for solvation or extensive mastication and mixing for blending.

SUMMARY OF THE INVENTION

This invention is concerned with an improved method of solvating crude butyl rubbers with common solvents therefore including the forming of a physical combination or a solution of a crude butyl rubber with a low boiling petroleum solvent, that is a crude butyl rubber dispersed phase within a low boiling petroleum solvent dispersing medium ranging from gel-like to liquid consistency. The invention constitutes means which expedite the solvating or dispersing and processing of crude butyl rubbers with common solvents therefor to enable wet mixing and blending, or other working of such rubbers, and which comprises extruding crude butyl ruber, while substantially raising its temperature, into forms of generally small mass with relatively large surface areas such as in thin rods of spaghetti-like configuration or ribbons and thus admixing with a low boiling petroleum solvent for crude butyl such as gasoline.

It is the primary objective of this invention to eliminate heretofore considered necessary operations in the solvating and working of tacky crude butyl rubbers together with the costly equipment required therefor such as rubber mills, and to reduce the period of time previously required to attain solvation or homogeneous, solvent softened and dispersed mixtures or solutions of solvent and rubber, thereby providing a significant over-all economy without sacrificing quality.

DESCRIPTION OF THE PREFERRED EMBODIMENT

This invention of improved means of solvating crude butyl rubber in a common solvent therefor essentially constitutes the heating of the crude butyl to a temperature of at least about 140° F., while extruding or otherwise forming the rubbery material into a body or bodies of relatively small mass and large surface area for optimum exposure, just prior to combining with a solvent. The increase in the temperature of the crude butyl, commensurate with its conversion to an appropriate particulate form for effective solvating, markedly diminishes its inherent tacky characteristic and in turn tendency of adhesion of the particulate bodies to each other whereby they can be quickly distributed within the solvent and therein effectively worked and blended until dissolved or uniformly dispersed without sticking and agglomerating together, rather retaining the small particle form with considerable surface area most receptive to the solvent penetration and action. In a particular application of this invention comprising forming a rubber-solvent combination of cement-like consistency for subsequent blending, it was found that such an extrusion in the form of thin rods of spaghetti-like strings at a temperature of about 250° F. eliminated the formerly required overnight solvent soaking in gasoline and obviated the previously necessary mastication and working with a rubber mill and a Taylor-Stiles rubber cutter, thereby reducing the overall time of the solvating operation and preparation of the cement with butyl rubber to 2 to 2½ hours total.

This invention can be practiced with any heated extrusion type apparatus which will handle crude butyl rubber and impart thereto the required temperature conditions of at least about 140° F. up to about 300° F. maximum. The extruded configuration of the heated rubber is not in itself a critical factor, small rods or ribbon-like shapes being most desirable to provide a body or particle mass of extensive surface area for solvent action and penetration, preferably cut off at appropriate length intervals such as by a revolving extruder knife to provide pellet-like bodies to permit easy mixing or agitation within the solvent without tangling or balling as may occur with elongated or substantially continuous rod or ribbon-like bodies. For example, the rubber may be extruded into rods about ⅛ to ½ inch in diameter and cut at about ½ to 2 inches in length, preferably about 1 inch in length, providing cylinder-like pellets of substantial surface area.

Such essentially tack free or non-adhering particles of crude butyl rubber as attained by the means of this invention are suitable for admixing with any appropriate solvent and thereby provide ample surface area for fast and effective solvent action and penetration and they become rapidly gelled or dispersed within the solvent dispersing medium producing a uniform physical combination or solution of a homogeneous consistency, the viscosity of which depends upon the relative proportions of rubber and solvent.

In addition to ordinary or unmodified crude butyl rubber comprising common commercial elastomers produced by the copolymerization of isobutylene with relatively smaller amounts of isoprene, the means of this invention are equally applicable and advantageous with crude halogenated butyl rubber or isobutylene-isoprene copolymers such as chlorobutyl or bromobutyl rubber in that the halogen modified butyl rubbers exhibit essentially the same undesirable inherent characteristics of flow, tackiness and adherence which are also effectively alleviated by the means of this invention.

Appropriate solvents for either unmodified butyl rubber or halogenated butyl rubber suitable for use in the practice of this invention comprise substantially any of the art-known effective solvents for such butyl rubbers, in particular the relatively low boiling petroleum solvents which include most lower hydrocarbons comprising petroleum ether composed of hydrocarbons predominantly of butane through octane, gasoline composed primarily of a mixture of n-heptane and iso-octane, naphtha or petroleum spirits, and hydrocarbons up to about kerosene which, although an effective solvent for butyl rubbers, is approaching such a high boiling point with respect to its removal as to render it marginal in many uses. Also apt solvents of course include individual components of such mixtures as mentioned above comprising for example n-hexane, n-heptane, n-octane, n-decane, as well as toluene, benzene, cyclohexane, and the like.

Although this invention is equally applicable and useful in substantially any operation requiring solvating of butyl rubbers for subsequent wet mixing with other ingredients or wet application for whatever purpose, it has been found to be particularly effective in the manufacture of the halogenated butyl rubber bonded composition brake blocks described in U.S. Letters Patent No. 3,390,113 to deGaugue, and is especially adaptable to and advantageous in the method of producing such products as described therein.

A specific and detailed illustration of the application of the means and procedures of this invention to such a practical use follows:

A 50 lb. batch of chlorobutyl rubber (Enjay HT–1066) was extruded through a twin screw extruder with the jacket of the extruder heated to 250° F. and forced through a die having a ⅜ in. diameter orifice forming rod-like bodies of approximately the die orifice diameter. A knife mounted on the extruder die was used to cut the extruding rod-like body into pieces approximately 1 to 2 inches in length. The hot extruded chlorobutyl rubber particles did not exhibit any tendency to adhere together, maintaining their discrete particle integrity rendering them facilely mixable as distinct particles. The so extruded particles of chlorobutyl rubber were discharged into 16⅔ gallons of gasoline in a running high speed impeller Struthers-Wells mixer. The extrusion required about ½ hour and mixing about 2 hours, or a total of 2½ hours over-all processing time produced a good smooth homogeneous cement-like consistency giving a Brookfield Viscosity reading of 40,000 at 82° F. using a No. 6 spindle at 10 r.p.m. A Cenco moisture test established the amount of volatile at 57.0 percent and the amount of solids at 45.2 percent. The thus produced cement was comparable in all regards to that formerly produced through a required overnight soaking in gasoline and processing on a rubber mill and Taylor-Stiles rubber cutter. This material was thereafter successfully utilized in the wet admixing and forming of composition brake shoes pursuant to the procedure and entailing the components set forth in the hereinbefore mentioned U.S. Letters Patent No. 3,390,113.

The following comprises an additional illustration of the solvating procedure of this invention wherein the rubbery component is hot formed into uncut or substantially continuous rod-like shapes and thus introduced into and admixed with the solvent by extruding heated spaghetti-like strings without severing directly into the solvent material:

A five pound batch of chlorobutyl rubber (HT–1066) was continuously passed through an extruder with a jacket temperature of 250° F. and discharged therefrom through a die with 3/16 inch holes in continuous spaghetti-form strings of approximately the same diameter. The temperature of the rubber at the die head following extrusion was 150 to 165° F. The substantially continuous elongated string-like bodies of hot rubber was conducted directly from the extruder into a tub of 1.67 gallons of rubber solvent naphtha. The hot string-like bodies of rubber do not adhere to each other or other materials so long as remaining hot, thus eliminating the need for a dusting agent. This combination of rubber and solvent was given a 4 hour soak period and then mixed in an intermeshing blade planetary Ross mixer until thoroughly gelled and in a very receptive condition for further mix or blending.

Subsequent runs were likewise carried out under identical conditions except with each a 2 hour and 96 hour soak period. The two hour soak period gave a soft gelled rubber which produced a good mix, but the individual strings of extruded rubber were yet discernible in the tub before mixing. The 96 hour soak period produced a completely homogenous gel which was easily mixable. The four hour soak period appears to represent an optimum for these materials and conditions.

The foregoing solvated rubber gels were then combined and blended with appropriate ingredients for the manufacture of a chlorobutyl rubber bonded, heavy duty friction material composition comprising cast iron chips, asbestos fiber, filler and rubber accelerators as set forth in the aforesaid Pat. No. 3,390,113, and thus extruded as pellets for subsequent molding, and air dried. Upon pressure molding into brake blocks and steam curing under usual condition for the manufacture of the brake block of Pat. No. 3,390,113, the thus prepared rubber produced a good, blister-free product comparable in all respects to those produced by previous techniques such as in the patent.

I claim:

1. In a process for solvating crude butyl rubber in order to permit wet application of the solvated butyl rubber, the improvement which comprises:

hot extruding the crude butyl rubber at a temperature in the range of from about 140° F. to about 300° F. into low boiling hydrocarbon solvent, and then dispersing the rubber essentially uniformly throughout the solvent by admixing for a period of not more than 96 hours without significant mastication.

2. The process of claim 1 wherein said admixing is continued for a period of about 4 hours.

3. The process of claim 1 wherein said admixing is continued for a period of about 2½ hours.

4. The method of claim 1 wherein the crude butyl rubber is extruded at a temperature of from approximately 200° F. up to about 300° F.

5. The method of claim 1 wherein the crude butyl rubber comprises a halogenated butyl rubber.

6. The method of claim 5 wherein the crude butyl rubber comprises chlorobutyl rubber.

7. The method of claim 1 wherein the low boiling hydrocarbon solvent comprises at least one low boiling petroleum solvent selected from the group consisting of petroleum ether, gasoline, naphtha, petroleum spirits, and kerosine.

8. The method of claim 7 wherein the low boiling petroleum solvent comprises gasoline.

9. The method of claim 1 wherein the crude butyl rubber is hot extruded as small distinct pellets into the low boiling hydrocarbon solvent.

10. The method of claim 6 wherein the crude butyl rubber is a chlorobutyl rubber extruded at a temperature approximately 250° F. in the form of small discrete pellets into gasoline.

11. The method of claim 10 wherein the crude butyl rubber is a chlorobutyl rubber extruded at a temperature approximately 250° F. in the form of small discrete pellets into gasoline.

References Cited

UNITED STATES PATENTS

| | | | |
|---|---|---|---|
| 2,992,200 | 7/1961 | Maly | 260—33.6 A |
| 3,475,397 | 10/1969 | Schoenbeck | 260—92.3 |
| 2,547,733 | 4/1951 | Baldwin | 260—33.6 A |
| 3,219,618 | 11/1965 | Freitag | 260—33.6 A |

MORRIS LIEBMAN, Primary Examiner

P. R. MICHL, Assistant Examiner

U.S. Cl. X.R.

260—34.2